Dec. 10, 1963   J. E. J. FEUILLY   3,113,645
AUTOMATIC SLACK ADJUSTER
Filed July 21, 1961   4 Sheets-Sheet 1
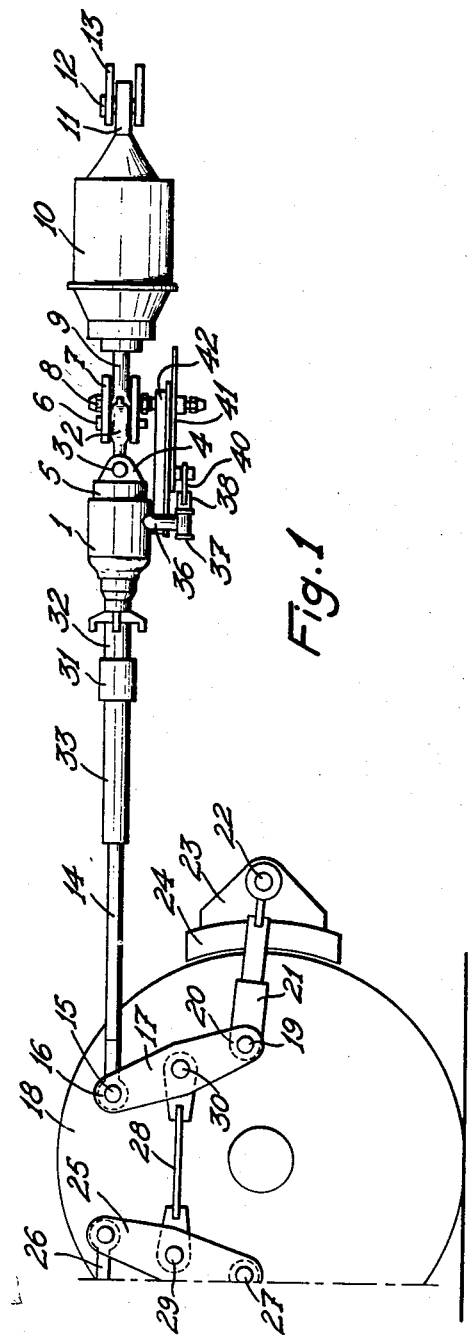
Fig.1
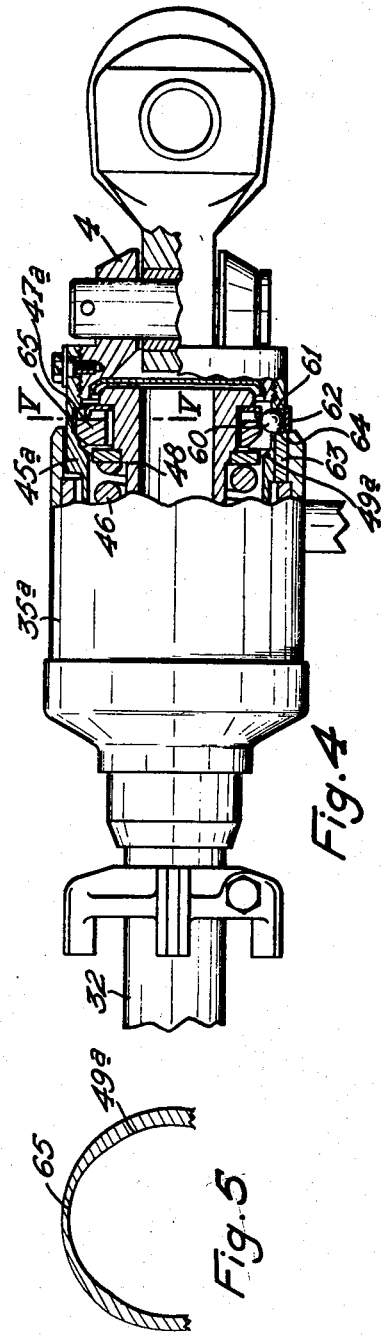
Fig.4
Fig.5

Dec. 10, 1963  J. E. J. FEUILLY  3,113,645
AUTOMATIC SLACK ADJUSTER
Filed July 21, 1961  4 Sheets-Sheet 2

Fig. 9
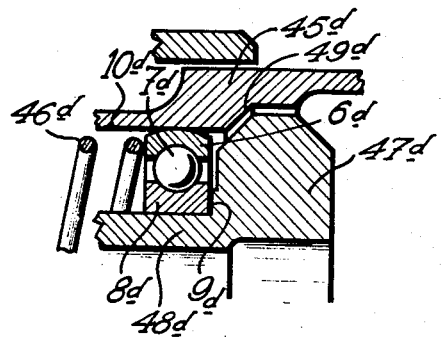
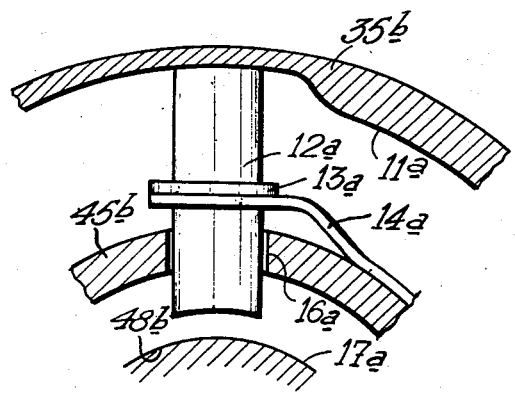
Fig. 6
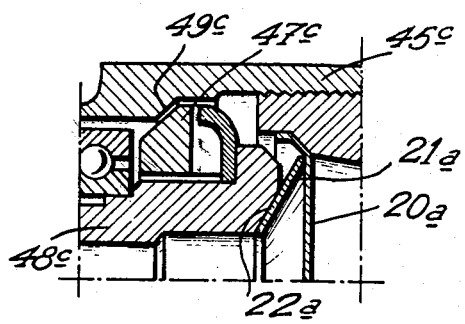
Fig. 7

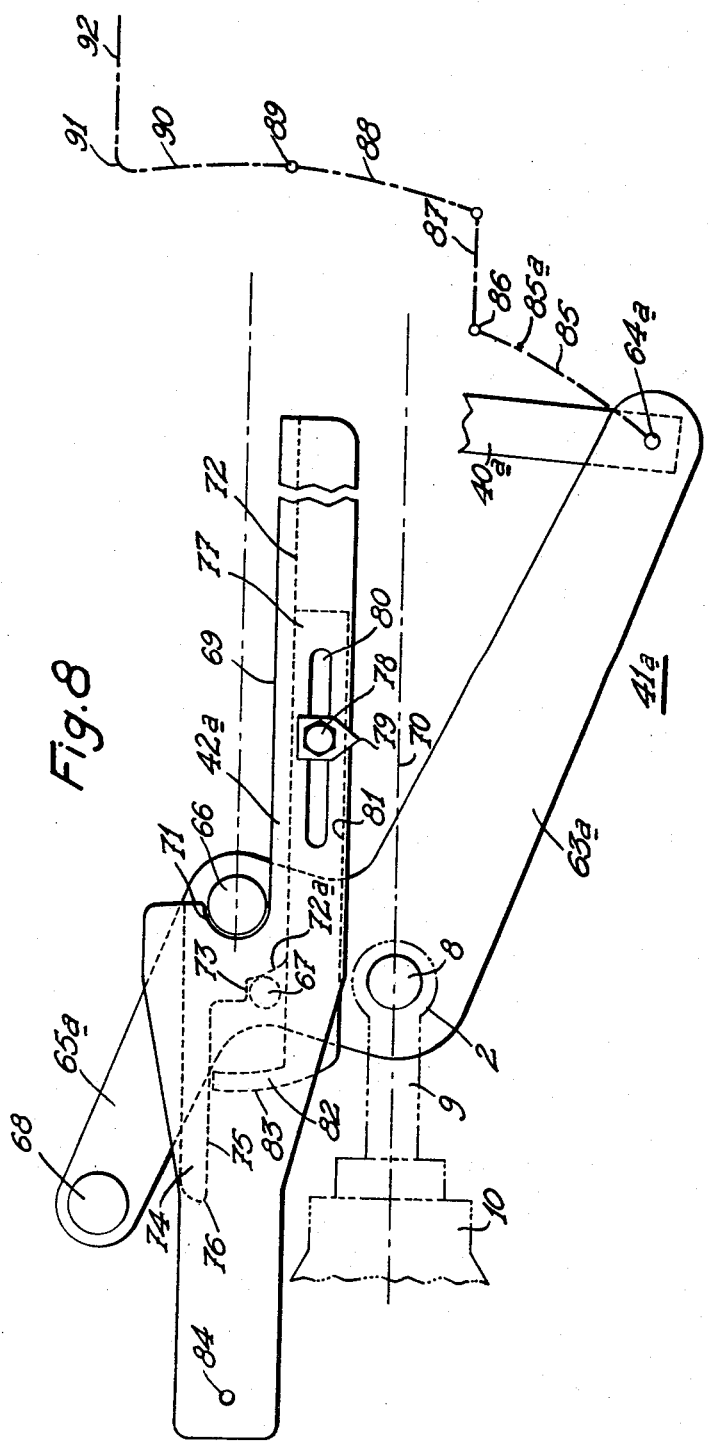

3,113,645
AUTOMATIC SLACK ADJUSTER
Jules Emile Joseph Feuilly, Paris, France, assignor to Societe Generale "Isothermos," Paris, France
Filed July 21, 1961, Ser. No. 125,788
Claims priority, application France July 21, 1959
14 Claims. (Cl. 188—196)

This patent application is a continuation-in-part of my earlier patent application Serial No. 43,874 filed on July 19, 1960 for "improvements for brake linkage adjusting devices."

The invention relates to automatic slack adjusters for brakes, particularly in railway vehicle brake systems, of the kind comprising a two-part brake rod, one part of which is displaceable axially in relation to the other rod part and comprises a non-selflocking screw-threaded spindle in meshing engagement with a nut carried by said other rod part, an operating member slidable axially on, and rotatable around, said other rod part and adapted to be dislaced thereon in one axial and rotary direction at application and in the other axial and rotary direction at release of the brake, and two clutch systems for coupling said operating member to said other rod part and to a stationary part of the adjuster under the control of the movements of said operating member in both directions, respectively. The operating member consists generally in a casing simultaneously displaceable rotatably around, and axially on, said other rod part under the action of a control rod interconnecting said casing and the piston of a brake control cylinder.

The main object of the present invention is to provide a device adapted to avoid accidental elongations of the adjuster as the result of jolts, and vibrations during travel of the vehicle when the linkage components are in the inoperative position, namely when the brakes are fully released.

Such a device may comprise either a locking device adapted to rigidly couple the other rod part and a fixed component of the adjuster or a motion discriminator associated with said other rod part and with the conventional thrust-ring which is angularly rigidly locked to said part, said motion discriminator being rendered inoperative during the actions of applying the brakes and of releasing same but being operative when the brakes are substantially in the condition of being fully released, thereby preventing incipient rotation of said other rod part of said thrust-ring, and hence also of the adjusting nut cooperating with the screw-thread on the spindle, in the direction producing elongation of the adjuster, yet without precluding possible motion in the direction producing shortening of the adjuster as the result of the aforementioned extraneous influences.

The thrust-ring can be mechanically integral with the other rod part or, alternatively, be of the self-centering type, in which case said ring will be rigidly locked to said other rod part angularly only.

Another object of the invention is to provide, in automatic slack adjusters of the character hereinabove specified, means for conferring motion of wide amplitude upon the movable casing.

For this purpose, the rocking angle-lever rotated about the crosshead pin of the brake-cylinder piston rod and connected to said movable casing by the control rod is equipped with three rollers which successively cooperate with three profiles, thereby making provision, in the course of an oscillation of said angle-lever, for a tilting stroke of great amplitude generating the unlocking of the aforementioned motion discriminator, this stroke being separated, by a rectilinear trajectory, from a further tilting stroke of great amplitude.

It is the practice in adjusters of the type restorted to hitherto, in cases where the slack in the brakeshoes is too great, to cause these adjusters to be shortened systematically by impulses of decreasing amplitude each time the brakes are released, by the action of a pawl-and-ratchet mechanism which, each time the control rod coupled to the housing returns in position, rigidly connects said housing and the other rod part. The action exerted by this pawl-and-ratchet mechanism decreases as the degree of slack to be taken up is decreased so that any existing slack cannot be taken up fully before the brakes have been applied and released again a large number of times.

Another object of the present invention is to provide, in automatic slack adjusters of the character set forth, a device designed to make use of the full stroke of the control rod coupled to the movable casing, in order to obtain systematic shortening of the adjuster, not as a function of the excess part of the stroke of the brake piston but by localizing such slack take-up action over the part of the stroke selected for normal service.

Should the shortening become excessive, it is automatically arrested by the reversibility feature of the adjuster (the adjuster screw, threaded spindle and nut being provided with a suitable pitch) and subsequently the adjuster returns to the normal setting. It should be noted that the screwing action, to obtain shortening of the linkage, can be designed to occur either when the brakes are applied or when they are released. Thus, in the case of the aforementioned casing with wide amplitude the further tilting stroke of great amplitude can be utilized, preferably during application of the brakes, for screwing-up, namely for shortening the adjuster.

Use of the whole control rod stroke to obtain a systematic shortening of an adjuster is virtually incompatible with retention of one of the advantages of adjusting devices resorted to hitherto, whereby a terminal portion of the control rod stroke is set aside for return to the set position in order to avoid inadvertent lenghtenings in the adjuster as a result of jolts, vibrations while the vehicle is travelling. It is feasible, however, to provide a remedy for this, as hereinbefore indicated by means of a locking device to rigidly couple the other rod part and a fixed component of the adjuster as said other rod part returns into the unlocked position.

Although it is obvious that such a locking device is unnecessary when vibrations or jolts of this sort need not be feared (passenger transport, etc.), due to the fact that the reduced inertia effects in the linkage are unlikely to cause any significant inadvertent lengthening in the adjuster, it is nevertheless a fact that adoption of a locking device of the type referred to can alone greatly improve resistance of the adjuster to undesirable lengthenings.

In certain brake linkage adjusting devices resorted to, the conditions under which the centering of the locking components for these adjusters operates are improved by providing a ball thrust bearing between the compression spring and its abutment, adjacent the thrust-ring, against the other rod part, and by providing this thrust-ring with a certain degree of radial play, in particular by mounting it on the other rod part through the medium of a plane or spherical clutch surface or by means of an Oldham coupling.

A further object of the present invention is to improve the operation of these devices by simplifying their construction and improving their performance, in particular their capacity for rapidly taking up large amount of slack in the brake shoes.

For this purpose, the ball thrust bearing consists of a ball bearing of the type commonly known as an "angularly-contact ball bearing."

It should be noted that this improvement is equally applicable to adjusters having a self-centering locking ring or to adjusters in which the ring is at all times rigidly secured to the other rod part of the adjuster.

In the latter case in particular, the inner race of the bearing is movable with said other rod part while its outer race absorbs the thrust exerted by the compression spring which is stationary in rotation.

With these and other objects in view which will become apparent from the following description the invention consists in the construction, combination and organization of parts hereinafter described and illustrated by way of examples in the accompanying drawings.

In the drawings:

FIG. 1 is a schematic illustration of the arrangement used for a slack adjuster in a brake-linkage system, the latter being only represented in part.

FIGS. 2 and 3, which join along the line A—A, are longitudinal section views partially cut away showing a first embodiment of an adjuster of the end-of-stroke locking type.

FIG. 4 is a longitudinal view partially cutaway of another embodiment of an adjuster of the end-of-stroke locking type.

FIG. 5 is a section view of the adjuster guide-sleeve, through the line V—V of FIG. 4.

FIG. 6 is a transverse section of a part of another embodiment of an adjuster of the end-of-stroke locking type.

FIG. 7 is a longitudinal section of part of a fourth embodiment of an adjuster of the end-of-stroke locking type.

FIG. 8 is a diagrammatic plan view of the configuration of the adjuster-casing controlling angle-lever and its associated slideway-piece.

FIG. 9 is a diagrammatic longitudinal section view of part of an adjuster equipped with an angular-contact bearing.

Figure 2:
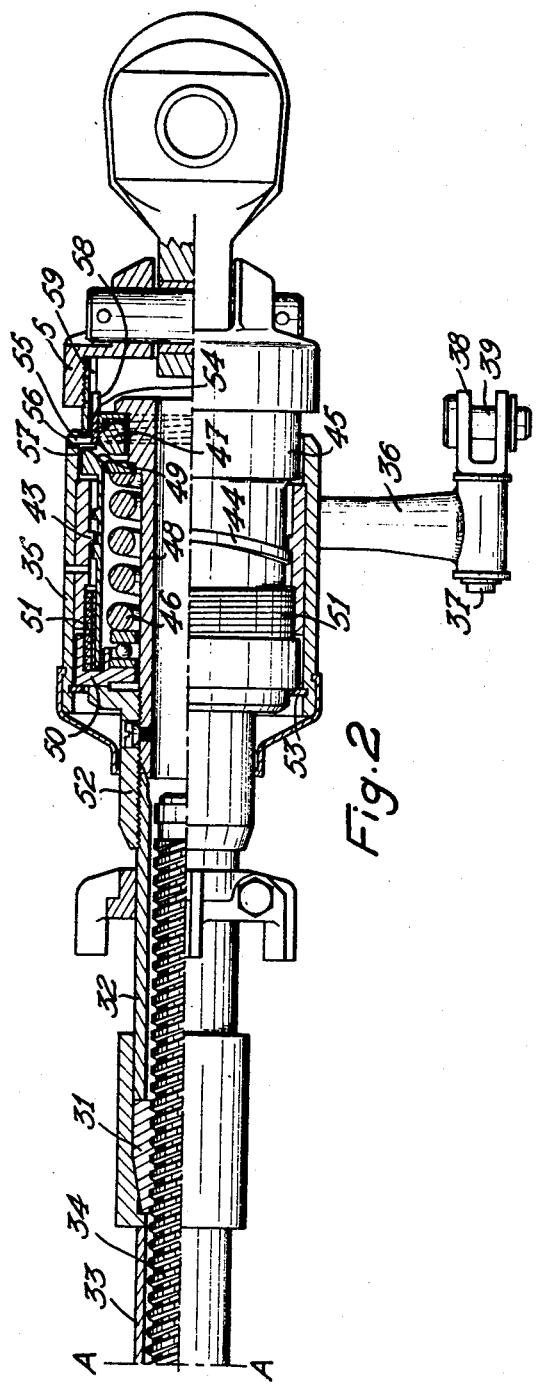
Figure 3:
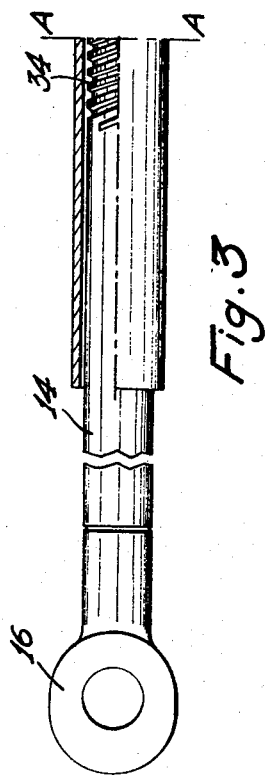

Referring now to FIG. 1 wherein, for greater clarity, there is shown a known brake-linkage arrangement, an adjuster 1 incorporated in a brake-linkage system is inserted into a traction rod and is coupled on one side, via an eye 2, hinged by means of a pin 3, on a yoke 4 integral with the head 5 of the adjuster, the eye 2 being traversed by a pin 6 set perpendicular to the pin 3 and fitted to one end of one of the double beam-levers 7 of the brake linkage. The other end of said beam-lever is mounted, via a pivot pin 8, on the terminal crosshead of the rod 9 of a brake-piston cooperating with a suspended cylinder 10 which terminates in an eye 11 attached, by means of a pin 12, to the corresponding end of a beam-lever 13 opposite the beam-lever 7, and these two beam-levers being coupled through the medium of a reaction-rod hinged onto pins located substantially midway along the beam-levers.

The adjusting spindle 14 which constitutes the extremity of the adjuster remote from that formed by the coupling on the guide-sleeve 5 is hinged, via a pin 15 and a corresponding eye 16, on one end of one of the beam-levers 17 of the brake system of a wheel 18, the other end of said beam-lever 17 being coupled via a pin 19 and a corresponding eye 20 to a drawlink 21 articulated, by means of a pin 22, on the support 23 of a brake-shoe 24. This wheel brake system further comprises a beam-lever 25 which is coupled to a rod 26 hinged and anchored to a fixed point, this beam-lever actuating, via a pin 27 and further analogous components, a brake-shoe arranged substantially diametrically opposite the brake-shoe 24. The beam-levers 17 and 25 are joined together by an intermediate reaction rod 28 attached, by means of pins 29 and 30 to the central portion of the two beam-levers.

The adjusting rod 14 is capable, in the manner well-known per se, of displacements relative to the adjuster 1, and to this end the latter comprises a nut 31 forming one piece with an adjusting tube 32 and with a protective sheath 33 enclosing a non-selflocking screw-threaded part 34 of spindle 14 (FIG. 2) associated to said nut, this assembly forming part of the rotating portion of the adjuster and being mounted rotatably within the body of the adjuster 1.

The latter comprises, externally, a movable casing 35 acting as an operating member and which actuates internal components capable of rotating about the overall axis of the mechanism. The casing 35 is integral with an arm 36 on the end of which is pivotably mounted a trunnion 37 terminating in a yoke 38 to which is attached, via a pin 39, an actuating rod 40 which is operated, in the manner well-known per se, by an angle-lever 41 which is pivotably mounted on an extension of the pivot pin 8 at right angles to the piston rod and which, as it travels across a slideway-piece 42, meets up with a roller mounted in fixed but adjustable fashion on said slideway-piece.

In known layouts, such an adjuster is reversible, that is to say it is capable, when the slack between the brake-shoes 24 and the wheel 18 is too small and when the brakes are applied, of producing an elongation by free unscrewing of the nut 31 on the spindle 14, this unscrewing action being arrested when forward travel of the pin 8 has caused the angle-lever 41 to tilt to a sufficient degree and thereby likewise causes the casing 35 to rotate by the action of the arm 36.

By virtue of the mode of operation of such adjusters, the latter are capable, in the event of excessive slack between the brake shoes 24 and the wheel 18, of imparting a controlled rotation to the nut 31 when the brakes are released, thereby shortening the adjuster by the screwing-up action of said nut on the spindle 14.

In the known types of mechanism, when the piston rod 9 moves back, which causes reverse tilting of the angle-lever 41, the casing 35 is able to move back also by virtue of its inner screw-thread 43 mating with the outer screw-thread 44 provided on a stationary guide-sleeve 45 integral with the head 5 and housed in said casing, this moving back of the casing 35 taking place progressively as the compression spring 46 inside the adjuster relaxes. The screw-threads 43 and 44 define between each other a longitudinal clearance. Furthermore, as soon as the thrust-ring 47, rigidly locked in rotation to the hollow shaft 48, has left its seat 49 on the guide-sleeve 45, casing 35 transmits its motion to the drive-ring 50 through the medium of a butt-wound coil spring 51 one end of which is attached to said drive-ring 50 and the other to said casing 35. This spring 51 has a friction fit inside a bore provided in the casing 35 and the turns of its coil are strongly pressed in expansion against said bore when the casing 35 rotates in that direction. Rotation of the nut 31 by the adjusting tube 32 is achieved by the combined friction of the drive ring 50 against two flat clutch systems constituted by the head of a coupling sleeve 52 rigidly locked to the adjusting tube 32 and to the hollow shaft 48 and against a snap ring 53 which arrests said drive-ring at the very periphery of the flange of coupling sleeve 52, this snap ring being inserted into a groove in the casing 35.

After each brake application, motion of the casing 35 causes the nut 41 to move up the screw-thread 34 when the slack between the shoes 24 and the wheel 18 is too great.

From the mode of operation shown above it is obvious that, when the brakes are applied and there is insufficient slack, the nut 31 will move towards the right of FIGURE 2 in free rotation on the screw-thread 34; for an oscillation of the arm 36 in the direction corresponding to application of the brakes causes freeing of the clutch system between the drive-ring 50 and the coupling sleeve 52, the casing 35 thereby rotating freely about the spring 51 until it has produced sufficient forward aravel of the guide-sleeve 45 by its rotation over the screw-thread 43 or until the spring 46 has been sufficiently compressed, and in any case until the thrust-ring 47 has arrested this rotation of the nut by friction on the seat 49.

Thus the screw-threaded spindle 14—34 forms one part of the conventional two-part brake rod and is displaceable axially in relation to the other rod part consisting of the adjusting tube 32 coupled by the coupling sleeve 52 to the hollow shaft 48 carrying the thrust-ring 47. The movable casing 35 is simultaneously displaceable rotatably around, and axially on, said other rod part under the action of the brake control device and adapted to be displaced, on the one hand, away from nut 31 while allowing a free displacement of said nut on the spindle, until the thrust-ring 47 acting as a clutch element engages the seat 49 of the stationary guide-sleeve 45 which acts as a clutch surface and, on the other hand, towards said nut while engaging the clutch system formed by the drive-ring 50, the head of the coupling sleeve 50 and the snap ring 53 for generating a controlled displacement of said nut on said spindle in the reverse direction.

It will easily be seen that in the brake-released configuration of such a mechanism, the various components of the adjuster will occupy the position shown in FIG. 2. The thrust-ring 47 is in the position remote from its seat 49, so that the hollow shaft 48, the adjusting tube 32 and the nut 31 are not restrained in rotation other than by the friction between the coupling ring 52, the drive-ring 50 and the snap ring 53 and between the spring 51 and the casing 35. If the vehicle equipped with the above adjuster sustains accidental jolts caused by bumps, passage over points or crossings or otherwise, the inertia effect in the brake linkage may be such that the reactions developed between the screw-thread 34 and the nut 31 may lead to incipient rotation of said nut 31, which would be liable to cause the slack to go out of adjustment to a very marked degree by repetitive action.

It will be noted that incipient rotation of the nut in the direction of screwing up is prevented by the spring 51 jamming against the casing 35 which is held stationary by the arm 36. Conversely, in the direction producing elongation of the adjuster, this spring is free to rotate in the casing 35 and unscrewing is opposed only by the small friction area between the drive-ring 50 and the snap ring 53.

In order to overcome this drawback in accordance with the present invention, and as may be seen on FIG. 2, in the position wherein the brakes are released the thrust-ring 47, which in this case is of the self-centering type, is able to pentrate via its outer rim into a coil spring 54 of which one extremity is bent and raised radially for forming a driving radial toe. This toe 55 is passed through a circular arcuate slot 57 in the stationary guide-sleeve 45 and thence into a marginal notch 56 on the casing 35, said slot and notch being provided at the ends of said guide-sleeve and casing which are closest to the clutch surface 49 of said guide-sleeve. The other end of the spring 54 is bent axially for forming an anchoring axial toe and this end 58 is introduced into an axial groove 59 in the end of the guide-sleeve 45 closest to said clutch surface. This spring is of the free-wound type, so that when it is in the relaxed state the inner diameter of the butt-wound coil is slightly greater than the outer diameter of the rim of the self-centering thrust-ring 47.

Thus when the brakes are in the applied condition, the thrust-ring 47 is capable, through compression of the spring 46, of fulfilling its locking function. When the brake is released, the thrust-ring 47 is able to revert to its position within the spring 54, the corresponding flank of the ring being chamfered to that end.

The direction of coiling of the spring 54 is such that it tends to tighten about the thrust-ring 47 when rotation takes place in the direction corresponding to unscrewing of the nut 31, whereas for any rotation corresponding to screwing up of the nut the coils of the spring 54 loosen up to permit rotation.

In the position wherein the brake is released, rotation of the casing 35 causes the radial flank of the notch 56 to transmit its motion to the raised end 55 of the spring 54, the other end of the latter being held stationary by the axial toe 58, and this motion of the extremity 55 results in the coils of the spring tightening about the thrust-ring 47, thereby immobilizing the rotating assembly of the adjuster which chiefly comprises the thrust-ring 47, the hollow shaft 48 rigidly locked angularly to said ring, the coupling sleeve 52, the adjusting tube 32 and the nut 31. When the brakes are applied, said coils free the thrust-ring 47 by return movement of the extremity 55 and consequent relaxation, spreading, of the spring.

In this position wherein the brakes are released, the adjuster is therefore effectively immobilized to prevent any accidental unscrewing due to inertia effects in the linkage. As soon as the brakes are applied, motion of the casing 35 relative to the guide-sleeve 45 frees the extremity 55, thereby enabling the spring 54 to spread and to free the thrust-ring 47 for normal operation. It may be noted that in this particular embodiment, the thrust-ring 47 need not necessarily be of the self-centering type and that it would suffice for it to be rigidly locked to the end of the hollow shaft 48.

The embodiment shown in FIG. 4 is a variant which enables the same results to be achieved as those set forth above. In this variant, the self-centering thrust-ring 47a is attached to the hollow shaft 48 by an Oldham coupling and has applied against its rim a ball 60 retained in a housing 61 embodied in the adjuster guide-sleeve 45a, and this ball bears externally against a spring blade 62 which closes the orifice of the housing 61 and forms the outer wall thereof.

The mechanism casing 35a is provided, on its side near the housing 61 in the guide-sleeve 45a, with a cylindrical sector-shaped control toe 63 of which the face 64 adjacent to the housing 61 is cut to an oblique profile. This profile is so determined as to ensure that when the casing 35a is in a position corresponding to the brakes released, as shown on FIG. 4, the ball 60 is raised to a certain extent in its housing 61 inwardly towards the axis of the adjuster, whereas if the casing 35a is in any position other than the inoperative one, said ball is free to move outwardly, if necessary, by bending the spring blade 62 in the process.

The ball 60 is thrust against the rim of the thrust-ring 47a, and since the latter is self-centering it is movable transversely.

The seat or clutch surface 49a on the guide-sleeve 45a on which thrusts the thrust-ring 47a has a conical shape mating with the conical shape of the thrust face of the self-centering thrust-ring 47a in order to permit centering action of the latter in the event of possible mutual play or errors of alignment between the various components of the adjuster, and this conical seat is supplemented by a further seat 65 or clutch surface which is likewise conical in shape but which is cut into the guide-sleeve 45a eccentrically and outwardly relative to the seat 49a (FIG. 5) and substantially diametrically opposed in relation to the ball 60 in radial alignment with the thrust-ring 47a at the release of the brake. This eccentric 65 is located to the rear of the seat 49a, namely on the same side as the yoke 4 used to attach the adjuster, and in a position such that the thrust-ring 47a is placed opposite said seat 65 when the compression spring 46 is stretched back to its maximum extent.

In this position the ball 60 offsets the thrust-ring 47a which then comes to lodge against the seat 65. Contact between the thrust-ring 47a and the seat 65 causes friction over a relatively large area, so that any incipient rotation is arrested, irrespective of whether such rotation is the result of screwing up or unscrewing of the nut 31 on the screw-thread 34.

During application of the brakes and when the latter are released, the adjuster casing 35a is caused to rotate, so that the ball is free to descend into its housing 61 via the profile 64 of the operating toe 63, thereby enabling the thrust-ring 47a to recenter itself and to revert to its normal operating condition.

Naturally, the toe 63 and the spring 62 could be associated to a manually-operated retracting mechanism, which would enable freedom of rotation to be restored to the thrust-ring 47a to permit manual adjustment if necessary, by rotating the tube 32 say.

As seen in FIG. 6, the movable casing 35b of an adjuster is provided, over part of the inner surface of its skirt, with a rising portion 11a which operates a spring stud 12a retained in position by a head 13a and a spring 14a. This spring stud assembly is freely movable within an aperture 16a of the stationary guide-sleeve 45b and the end of the stud is resiliently and frictionally applied against the side of a flange 17a terminating the hollow shaft 48b. This flange retains the intermediate mobile portion of, say, an Oldham coupling designed to rotate the thrust-ring while at the same time allowing it the required degree of side play.

With this arrangement, the movable casing applies the stud against the rotating part 17a over a small sector which corresponds to both releasing of the brake and action of the raised portion 11a. Such a layout prevents inadvertent loosening when the brake is in the released position and the system can be angularly adjusted so that the portion 11a is disengaged as required over a wider sector (particularly in the case where the presence of ice may require that a restriction be imposed on unscrewing).

In contradistinction, after the movable casing 35b has rotated sufficiently for the raised portion 11a to be disengaged, the stud is drawn back by the spring 14a and rotation of the central parts (hollow shaft) rendered free.

It will also be advantageous to provide a frictional component of the adjuster referred to which is retractable at will, either by hand or automatically, in order to revert to a condition of total freedom for the adjuster, so as to facilitate either current servicing adjustments or unscrewings of the adjuster when systematic lengthenings are necessary after a shortening action. Such retraction can be obtained by ensuring that the connection between the spring stud and the movable casing is effected through the medium of a bulge acting as a cam, or by providing a suitably located cutaway which reduces or eliminates totally the rubbing action in question once a preset position of the adjuster casing is reached. The hand-operating means may take any form whatsoever, a draw-ring, latching device, or the same, being examples.

FIG. 7 shows a locking arrangement which comprises, furthermost inside the guide sleeve 45c, a cup 20a which retains a resilient conical washer 21a by thrusting against the latter edge, the convex face of which washer cooperates with a conical seating 22a provided on the end of the hollow shaft 48c.

In this way when the adjuster is loosened, by separation of the seating 49c and the thrust-ring 47c in the neutral position, i.e. when the brakes are released, the hollow shaft is retained by the resilient friction between seating 22a and washer 21a, thus protecting the adjuster from accidental lengthenings due to unavoidable shocks or vibrations.

Clearly, other mutual locking methods, both of the resilient and the positive-acting type, could be used between the hollow shaft and the guide-sleeve, such locking systems being exemplified by those comprising sprung retractable elements and corresponding receiving recesses which cooperate as the shaft recedes in the sleeve, or by those which are positively actuated by relative motion between said shaft and said sleeve.

Similarly, the actuating friction between the hollow shaft and the casing could be automatically proportioned by means of a further set of cam profiles which increase or reduce the action of spring 14a, according to the degree of travel of the casing; alternatively this friction could be established or suppressed at will to allow adjustments or other installation or maintenance work to be carried out on the adjuster.

Lastly, a given adjuster may naturally comprise one or more such arrangements in various combinations.

As may be seen from FIG. 8, the angle-lever 41a which controls the movement of the adjuster movable casing by means of the control rod 40a, is mounted on an extension of the pivot pin 8 of the terminal crosshead 2 of the rod 9 of the piston associated to the brake cylinder 10. This angle-lever 41a is provided with a long arm 63a terminating at the location of the pivot 64a on which the control rod 40a is articulated, with a short intermediate arm directed roughly perpendicular to said long arm, and with an extension 65a directed substantially parallel to the long arm. The short intermediate arm is provided with a long roller 66 substantially at its junction with the extension 65a and a short roller 67, while the end of the extension 65a is provided with a long roller 68, and these rollers are located on the same side in relation to the pivot pin 8 around which the intermediate arm is pivotally mounted substantially at its junction with the long arm 63a.

This angle-lever cooperates with a slideway-piece 42a provided with a multiplicity of profiles and extending over said angle lever.

As the rod 9 of the brake piston travels forward the pin 8 translates the angle-lever 41a along the path 70, and in order to preserve freedom of movement the slideway-piece 42a is mounted for low-amplitude oscillation about a gudgeon 84 provided at one of its ends, said gudgeon 84 being fixed to a suitable support in the direction of the brake releasing stroke with respect to the pivot pin 8.

One profile 69 formed by an edge of the slideway-piece 42a directed opposite to gudgeon 84 is arranged, in the inoperative position and as shown in FIG. 6, parallel to the line of travel 70 of the rod 9, and this profile cooperates with the long roller 66. It terminates towards the gudgeon 84 in a semi-cylindrical thrust-notch 71 for the roller 66.

Along the body of the slideway-piece 42a is embodied a second profile 72 parallel to the profile 69, over which can slide the short inner roller 67 and which in the released condition of the brake is disposed between said profile 69 and the line of travel 70. The profile 72 terminates towards said gudgeon 84, at its end nearest the thrust notch 71, in a cylindrical-sector-shaped profile section 72a coaxial with the notch 71 and extending away from the line of travel 70, and the short roller 67 is capable of travelling over this profile 72a when the roller 66 is engaged in the notch 71. The profile 72a terminates in a thrust stop 73 which is designed to prevent excessive tilting of the angle-lever 41 when the brakes are released.

Beyond the thrust stop 73 towards the gudgeon 84, the body of the slideway-piece 42a incorporates a wing 74 which provides a profile 75 parallel to profile 69 but located on the opposite side thereto relative to the profile 72. This profile 75 is designed to cooperate with the long roller 68 after the latter has passed over the terminal beak 76 of said wing 74.

The slideway-piece 42a is associated to a piece 77 of lesser height than the profile 72, beneath which the head of short roller 67 is able to pass. This piece is fixed against the side of slideway-piece 42a and against the profile 72 by means of a bolt 78 carrying a pointer 79, said bolt passing through an adjustment slot 80 in the body of the slideway-piece which slot is cut parallel to the profile 72 and disposed in the released position of the brake between the profile 72 and the line of travel 70.

This piece 77 provides a profile 81 parallel to the profile 72 and located in the released position of the brake between said profile 72 and said line of travel 70 and terminates in a beak 82 which comes into contact with the profile 75 and which provides a further cylindrical profile 83 joining onto said profile 75 and directed away from the line of travel.

Such a mechanism operates as follows:

In the position wherein the brakes are released, as shown in FIG. 8, the long roller 66 is located in the notch 71 and the short roller 67 is on the profile 72a and against the stop 73. The pivot 64a is in its maximum rearward position, the rod 40a having fetched the casing 35 into a position corresponding either to tightening of the motion discriminator 54 against the thrust-ring 47 (FIG. 2), or to partial expulsion of the ball 60 from its housing which in turn fetches the thrust-ring 47a against the thrust face 65 (FIG. 4). Thus the rotating assembly of the adjuster is locked to prevent any accidental elongation liable to put it out of adjustment as the result of inertia effects in the linkage system, due to jolts or bumps.

When the brakes are applied, the pivot pin 8 moves towards the right in FIG. 8, along the path 70. The short roller 67 travels over the length of profile 72a, thereby tilting the angle-lever 41a, while pivot 64a travels along the circular path indicated at 85 until it reaches a position 86 corresponding to passage of short roller 67 onto the profile 72. This wide angular displacement of pivot 64a along the path 85, which is slightly inclined opposite to said pivot pin 8 with respect to the line of travel 70, with its concavity directed towards said pivot pin, represents a degree of unhampered travel corresponding to unlocking of the rotating assembly of the adjuster.

Beyond the point 86, pivot 64a follows a rectilinear path 87 parallel to, and in the direction of, the brake application stroke without angular tilting which corresponds to simultaneous travel of long roller 66 on profile 69, of short roller 67 on profile 72 and of long roller 68 on profile 75, said long roller 68 having moved beneath the beak 76 in the course of path 85 being covered.

This path 87 has no rotating effect on the casing 35.

When long roller 68 encounters profile 83, angle-lever 41a, under the thrust exerted by the pin 8 which is located on the same side with respect to the three rollers, describes a complementary tilting movement and its pivot 64a moves along the circular path 88 symmetrical with respect to the direction of brake application stroke and having the same direction as the circular path 85 with its concavity directed towards the pivot pin 8, thereby imparting to the casing 35 the oscillation which, via the threads 43 and 44 of the adjuster, shifts it in such a way as to cause the rotating assembly of the adjuster and the hollow shaft 48 in particular to travel to the left of FIGS. 2 and 4.

Up to a point 89 along the path 88, corresponding to application of the thrust-ring 47 against its seat 49 or 49a, the path 88 represents the positions of casing 35 comprised within the so-called "free zone."

Since the thrust-ring 47 is not applied against its seat 49, if the slack at the brake-shoes is too small, then when the latter are applied against the wheel the adjuster will be under slight tension only, and this tension will be inadequate to compress the spring 46. Under such conditions, the clutch effect between the coupling ring 52 and the drive ring 50 becomes insufficient to overcome the reversing torque between the thread 34 and the nut 31. As a result, in the event of inadequate slack at the brake-shoes 24, the adjuster lengthens itself until it is restored to the length corresponding to correct slack.

This motion ceases as soon as the pivot 64a has reached the position shown at 89 which corresponds to the beginning of the "locked zone." Beyond this position 89, the circular path 88 extends over a sector 90 corresponding to rotation of the casing 35 with respect to locked rotating assembly of the adjuster in the so-called "locked zone," and this rotation can take place freely by virtue of the clearance existing between the threads 44 on the guide-sleeve 45 and the threads 43 within the casing 35. The rotating assembly of the adjuster ceases to move forward in the guide-sleeve and the casing 35 is able to pursue its rotation, by separation of threads 43 and 44, until the pivot 64a reaches the bend 91 which marks the end of angle-lever tilting motion, said bend leading onto a straight path 92 parallel to, and in the direction of, the brake application stroke which corresponds to travel of the long roller 66 over the profile 69 and of long roller 68 over the profile 81. This path 92 corresponds to the lost motion resulting from the elastic deformation of the brake linkage system due to the pursuance of the forward travel of piston rod 9 after the brake-shoes 24 have been applied against the rim of the wheel 18.

When the brakes are released, the angle-lever describes reverse tilting motions and returns to the position shown in FIG. 8.

Should the slack between the brake-shoes 24 and the wheel 18 be too great, then, when the brakes are applied, rotation of the casing 35 tends to transmit this rotation to the spring 51, the direction in which the latter locks tight with the casing 35 and the drive ring 50 being chosen to that end, and this rotation is imparted to said ring whence it is in turn transmitted by friction to the coupling ring 52 as soon as thrust-ring 47 has been released, a condition which occurs as soon as some preset intermediate point, say 85a, has been crossed along the path 85. To this end, the directions of the turns of the screw-thread 34 and of the spring 51 in particular are chosen to ensure a drive coupling, through the medium of said spring, between the casing 35 and the drive ring 50 during motion of the casing corresponding to brake application, in contradistinction to what takes place in similar mechanisms resorted to hitherto in which this screwing-up or shortening of the adjuster is provided during the converse motion, namely during brake release. Evidently, the motions referred to above could be made to take place by a reverse process, namely when the brakes are released.

Insofar as shortening of the adjuster is concerned in the example mentioned hereinabove, no such action takes place while the path 87 is being covered, but while the path 88 is being covered in the "free zone," shortening takes place until the pivot 64a reaches the point 89, namely the transition point from the "free zone" to the "locked zone." Thenceforward, the casing 35 continues to rotate but the rotating assembly of the adjuster is immobilized and rotation of said casing 35 can take place only by sliding over the spring 51.

It may be noted that this screwing up motion is automatically arrested as soon as the adjuster has been restored to the length corresponding to the normally-provided slack between the brake-shoes and the wheels, any further shortening resulting in freeing of the nut 31 and of the rotating assembly of the adjuster, as stated precedingly.

Thus it will be appreciated that shortening of the adjuster is controlled not in proportion to excess brake piston stroke as previously taught, which results in the slack being taken up in steadily decreasing degrees which must unavoidably be spread over a large number of braking operations, but by localizing such take-up over the part of the active stroke of the piston chosen for normal service and, moreover, during the phase of the braking operation in which the brakes are being applied. Thus the energy devoted to slack take-up is greater than that which could be developed by the brake-linkage return spring alone, as is the case when take-up is effected during brake release action. Slack take-up control action is thus constant and of increased amplitude and its motive power is derived from the brake-cylinder, thereby providing for a degree of take-up which it is advantageous to design well in excess of anticipated requirements, taking advantage of the automatic reversibility feature of the adjuster for restoration of the desired slack.

During return release travel of the brakes, rotation of the casing 35 provoked by the opposite tilting motion of the angle-lever 41a takes place without such rotation being communicated to the spring 51 which performs the function of motion discriminator and which then slides freely over its thrust faces, so that all accidental parasite rotation tending to lengthen the adjuster is avoided during the brake release stroke.

Referring now to FIG. 9, the adjuster compression spring 46d, which is rendered angularly integral with hollow shaft 48d accommodated inside guide-sleeve 45d with which is integral the seat or clutch surface 49d, is applied, at its end opposite that seat against the drive ring (not shown), against outer race 6d of an angular-contact ball bearing 7d whose inner race 8d is supported on the outer surface of shaft 48d and against a shoulder 9d thereof.

The lateral surface of race 6d is substantially of spherical contour, being centered onto the main axis of the adjuster.

In this way, contact between race 6d and guide-sleeve 45d cannot give rise to friction, since both components are stationary relative to each other.

By matching the bore 10d of the guide-sleeve 45d to the outer diameter of ring 6d, a point-by-point centering is ensured of the corresponding moving parts in the adjuster, in particular between thrust-ring 47d and seat 49d. Obviously, the thrust-ring 47d can be fixed directly to shaft 48d or be mounted thereon through the medium of a self-centering coupling such as an Oldham coupling or a plane or spherical clutch surface.

As a result of this arrangement, the outer race 6d, adjacent to the stationary guide-sleeve 45d fixed to the coupling yoke, cannot therefore be the cause of any malfunction resulting, say from jamming or from friction, in the event for said adjuster of failing to have all its component elements correctly aligned.

Indeed, to prevent any form of frictional thrust in such cases, the spherically contoured surface of the outer race 6d is made a close fit in the corresponding bore 10d of the guide-sleeve, thus ensuring, through provision of such a ball-joint, correct centering to the bevelled faces of the thrust-ring 47d and of the latter seat 49d.

It is to be clearly understood that many modifications can be made to the embodiments described hereinabove without departing from the scope of the invention as defined in the appended claims.

What I claim is:

1. An improvement in an automatic slack adjuster in a brake linkage system of the type having a two-part brake rod one part of which is displaceable axially in relation to the other rod part and having a non-selflocking screw-threaded spindle meshing with a nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing a free displacement of said nut on the spindle in one direction, until a clutch element carried by said other rod part engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; the improvement comprising a thrust-ring surrounding the other rod part and acting constituting a clutch element, means for connecting said thrust-ring to said other rod part, and an angular contact ball thrust-bearing having an inner race supported by the other rod part and an outer race in contacting engagement with the said compression spring being engaged with the outer race.

2. An improvement in an automatic slack adjuster in a brake linkage system of the type having a two-part brake rod one part of which is displaceable axially in relation to the other rod part and having a non-selflocking screw-threaded spindle meshing with a nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing a free displacement of said nut on the spindle in one direction, until a clutch element carried by said other rod part engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system said other rod part, nut, clutch element and clutch system forming a rotary assembly, the free displacement of the nut on the spindle corresponding to unscrewing of said nut which causes elongation of the adjuster; the improvement comprising: a locking device carried by the stationary guide-sleeve for locking the other rod part with the clutch element disengaged from the clutch surface, and means carried by one of the elements of the rotary assembly for, on the one hand, engaging said locking device with said other rod part as soon as the brake is fully released in order to then prevent inadvertent lengthening in the adjuster by unscrewing of the nut and, on the other hand, disengaging said locking device from said other rod part in response to a brake application.

3. An automatic slack adjuster according to claim 2, wherein the locking device comprises a radially movable friction element carried by the stationary guide-sleeve and extending between the movable casing and the other rod part.

4. An automatic slack adjuster according to claim 2, wherein the locking device comprises a stationary member carried by the stationary guide-sleeve and having a surface at right angles to the adjuster, the means for engaging said locking device with, and disengaging it from, the other rod part comprising a member of flexible material between said stationary member and the free end of said other rod part for being applied against said stationary member with the clutch element disengaged from the clutch surface and for being disengaged from said stationary member upon application of the brake.

5. An improvement in an automatic slack adjuster in a brake linkage system of the type having a two-part brake rod one part of which is displaceable axially in relation to the other rod part and has a non-selflocking screw-threaded spindle meshing with an nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing free displacement of said nut on the spindle in one direction, until a clutch element carried by said other rod part engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; the improvement comprising a movable casing having an inner surface comprising a projecting portion extending over a relatively small sector on said inner surface, the other rod part including a cylindrical flange radially aligned with said projecting portion upon release of the brake, a radial stud including a head disposed between the movable casing and the stationary guide-sleeve and freely movable within an aperture provided in said sleeve, said aperture being in radial alignment with said projecting portion upon release of the brake, and spring means bearing under the stud head for urging said stud against the inner surface of said movable casing so that said stud resiliently and frictionally engages said cylindrical flange under the action of said projecting part upon release of the brake while upon application of the brake said stud is disengaged from said cylindrical flange.

6. An improvement in an automatic slack adjuster in a brake linkage system of the type having a two-part brake rod one part of which is displaceable axially in relation to the other rod part and has a non-selflocking screw-threaded spindle meshing with a nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing a free displacement of said nut on the spindle in one direction, until a clutch element carried by said other rod part engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; the improvement comprising a conical seat on said other rod part, a cup secured inside the stationary guide-sleeve, and a conical washer having an edge of greater diameter bearing against said cup and a conical face applied against said conical seat.

7. An improvement in an automatic slack adjuster in a brake linkage system of the type having a two-part brake rod one part of which is displaceable axially in relation to the other rod part and having a non-selflocking screw-threaded spindle meshing with a nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing a free displacement of said nut on the spindle in one direction, until a thrust-ring surrounding and connected to said other rod part and constituting a clutch element engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; said other rod part, nut thrust-ring and clutch system forming a rotary assembly, the free displacement of the nut on the spindle corresponding to an unscrewing of said nut which generates an elongation of the adjuster, the improvement comprising: a radially deformable device carried by the stationary guide-sleeve and disposed outwardly with respect to one of the elements of the rotary assembly with the clutch element disengaged from the clutch surface, and means carried by the movable casing for controlling said device in order to apply said device against said assembly element with the brake fully released, whereby said device and means act as a motion discriminator inoperative during braking application and release operations but immediately operative as soon as the brake is fully released for then preventing inadvertent lengthening in the adjuster by unscrewing of the nut.

8. An improvement in an automatic slack adjuster in a brake linkage system of the type having a two-part brake rod one part of which is displaceable axially in relation to the other rod part and having a non-selflocking screw-threaded spindle meshing with a nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing a free displacement of said nut on the spindle in one direction, until a thrust-ring surrounded and connected to said other rod part and constituting a clutch element engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; the improvement comprising a movable casing having a marginal notch at its end closest to the clutch surface of the stationary guide-sleeve, a guide-sleeve having an axial groove at its end closest to said clutch surface and with a circular arcuate slot between said groove and clutch surface, a spring having butt-wound coils, housed within said guide-sleeve housing the thrust-ring when the brake is released and including at one end an anchoring axial toe slidably mounted in said axial groove and at its other end a driving radial toe passing through said circular arcuate slot and inserted in said marginal notch, said spring being constructed and arranged such that the spring has coils which are spread open during actuation of the movable casing and which tighten about the thrust-ring with said casing moved in the released condition of the brake.

9. An automatic slack adjuster according to claim 8, wherein the thrust-ring is loosely mounted around the other rod part and the means connecting said thrust-ring to said other rod part consisting of an Oldham coupling permitting a transverse motion of said ring with respect to said part while ensuring their angular locking together.

10. An improvement in an automatic slack adjuster in a brake linkage system of the type having a two-part brake rod one part of which is displaceable axially in relation to the other rod part and having a non-self-locking screw-threaded spindle meshing with a nut secured on said other rod part which is surrounded by a movable casing simultaneously displaceable rotatably around, and axially on, said other rod part under the action of a brake contol device with a brake cylinder and a brake piston and adapted to be thus displaced, on the one hand, away from the nut while allowing a free displacement of said nut on the spindle in one direction, until a thrust-ring surrounding and connected to said other rod part and constituting a clutch element engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; the improvement comprising a self-centering thrust-ring angularly locked to the other rod part and transversely movable relative thereto, a stationary guide-sleeve having an outwardly directed eccentric clutch surface parallel to its clutch surface and radially aligned with said thrust-ring at the release of the brake, an off-centering device controlled by the movable casing and adapted to offset said thrust-ring at the release of the brake so that said ring engages said eccentric clutch surface.

11. An improvement in an automatic slack adjuster in the brake linkage system of the type having a two-part brake rod one part of which is displaceable axially in relation to the other rod part and comprises a non-self-locking screw-threaded spindle meshing with a nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing a free displacement of said nut on the spindle in one direction, until a thrust-ring surrounding and connected to said other rod part and constituting a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; said other rod part, nut, thrust-ring and clutch system forming a rotary assembly, the free displacement of the nut on the spindle corresponding to unscrewing of said nut which generates elongation of the adjuster, the improvement comprising: a locking device carried by the stationary guide-sleeve for locking the other rod with the clutch element disengaged from the clutch surface, means carried by one of the elements of the rotary assembly for, on the one hand, engaging said locking device with said other rod part as soon as the brake is fully released in order to then prevent inadvertent lengthening in the adjuster by unscrewing of the nut and, on the other hand, disengaging said locking device from said other rod part in response to a brake application, and a controlling assembly comprising an angle-lever interconnecting the brake piston and the movable casing, a pivotable guideway-piece and interengaging means carried by said angle-lever and guideway-piece for successively controlling, from the beginning to the end of a brake application operation, the action of the means engaging the locking device to unlock said clutch element to provide a free rotation of said rotating assembly, then simultaneously the locking of said rotating assembly to the stationary guide-sleeve and a rotary motion of the casing with respect to said locked rotating assembly, and, finally, a displacement of the adjuster parallel to its axis in correspondance with the lost motion resulting from the elastic deformation of the linkage system under the action of the brake cylinder.

12. An improvement in an automatic slack adjuster in a brake linkage system of the type having a two-part brake rod one part of which is displaceable axially in relation to the other rod part and having a non-self-locking screw-threaded spindle meshing with a nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing a free displacement of said nut on the spindle in one direction, until a thrust-ring surrounding and connected to said other rod part and constituting a clutch element engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; the improvement comprising an angle-lever including two substantially parallel arms one of which is shorter than the other and an intermediate short arm interconnecting said parallel arms and substantially perpendicular thereto; a pivot pin carried at right angles by the piston rod of the brake cylinder and on which said intermediate arms is pivotably mounted about a point substantially coinciding with its junction with the long arm, a rod interconnecting the end of said long arm and the movable casing; a first roller pivotally mounted on said intermediate arm substantially at its junction with the short arm, a second roller pivotally mounted on said intermediate arm closer to the pivot pin than said first roller, a third roller pivotally mounted at the end of the short arm; a fixed gudgeon located with respect to said pivot pin in the direction of the brake releasing stroke, and a slideway-piece extending over said angle-lever and one end of which is pivotally mounted on said gudgeon, said slideway-piece having a set of three profiles cooperating with the three rollers and terminating opposite to said gudgeon in portions parallel to one another and to the line of travel of said pivot pin with the brake at rest in released condition, the first profile which cooperates with the first roller ending towards the gudgeon by a thrust circular notch which engages said first roller in said rest condition, the second profile which cooperates with the second roller being located in said rest position between said first profile and said line of travel and ending successively towards said gudgeon by a cylindrical-sector-shaped section directed away from the line of travel and coaxial with said circular notch and by a thrust stop which simultaneously engages said second roller in said rest condition, the third profile which cooperates with the third roller being provided on a piece slidably mounted with respect to the first and second profiles and located in said rest position between said second profile and said line of travel and ending successively towards said gudgeon by a cylindrical portion directed away from the line of travel and by a rectilinear thrust portion to said profiles which is located on the opposite side to the first profile relative to the second profile, said rectilinear thrust portion ending by a beak over which passes the third roller, whereby are successively imparted to the junction point of said interconnecting rod with said angle-lever, from the beginning to the end of a brake application operation, a first circular path slightly inclined opposite to said pivot pin with respect to the direction of the brake application stroke of said pivot pin with its concavity directed towards the pivot pin, a first rectilinear path parallel to, and in the direction of, said brake application stroke, a second circular path substantially symmetrical with respect to said direction of brake application stroke and having the same direction as said first circular path with its concavity directed towards the pivot pin, and a second rectilinear path parallel to, and in the direction of, said brake application stroke.

13. An automatic slack adjuster according to claim 12, wherein the second roller is shorter than the first and third rollers, and wherein the slideway-piece comprises a flat body having one edge which forms the first profile and the thrust circular notch, a stepped portion on one of its faces which forms the second profile with its cylindrical section and thrust-stop as well as the rectilinear thrust portion of the third profile and an adjustment slot parallel to the profiles and located in said rest position between the second profile and said line of travel, the piece slidably mounted with respect to the first and second profiles being of lesser height than the second profile for allowing the passage of the second roller, said piece being slidable in contacting engagement of one of its edges with said second profile and said rectilinear portion while its edge opposite its contacting edge forms the third profile and its cylindrical portion, and means carrying said piece and displaceable through said slot.

14. An improvement in an automatic slack adjuster in a brake linkage system of the type having a two-part brake rod one part of which is displaceable axially in relation to the other rod part and having a non-selflocking screw-threaded spindle meshing with a nut secured on said other rod part which is surrounded by a movable casing simultaneously displaceable rotatably around, and axially on, said other rod part under the action of a brake control device with a brake cylinder and a brake piston and adapted to be thus displaced, on the one hand, away from the nut while allowing a free displacement of said nut on the spindle in one direction, until a clutch element carried by said other rod part engages a clutch surface provided on a stationary guide-sleeve housed in said casing and, on the other hand, towards said nut while engaging a clutch system connected to said other rod part for generating a controlled displacement of said nut on said spindle in the reverse direction, a compression spring being between the clutch element and the clutch system; the improvement according to which, when the free displacement of the nut on the spindle corresponds to an unscrewing of said nut generating an elongation of the adjuster, the clutch system comprises a coupling sleeve rigidly locked on the other rod part, a snap-ring carried by the casing, a drive ring loosely mounted on said other rod part and in contacting engagement with said coupling sleeve and snap-ring in response to the displacement of said casing towards the nut, and a butt-wound coil spring surrounding the stationary guide-sleeve and the ends of which are attached to said drive ring and to said casing, said spring frictionally fitting with said casing, said casing having an inner screw-thread in meshing engagement with an outer screw-thread of the stationary guide-sleeve while defining with said latter screw-thread a longitudinal clearance, the directions of the turns of said screw-threads, butt-wound coil spring and screw-threaded spindle being determined such that should the slack be to great, when the brake is applied, said casing and drive ring which are coupled for rotation by said spring generate by the controlled displacement of said nut on said spindle shortening of the adjuster while taking advantage of the power developed by the brake control system during the brake application stroke.

References Cited in the file of this patent
UNITED STATES PATENTS

| | | |
|---|---|---|
| 1,983,897 | Browall | Dec. 11, 1934 |
| 2,774,449 | Browall | Dec. 18, 1956 |
| 2,973,840 | Newell | Mar. 7, 1961 |